United States Patent
Rahmfeld et al.

(10) Patent No.: US 11,934,392 B2
(45) Date of Patent: *Mar. 19, 2024

(54) METHOD AND SYSTEM FOR DATA CONVERSATIONS

(71) Applicant: Alation, Inc., Redwood City, CA (US)

(72) Inventors: Joachim Rahmfeld, Los Altos, CA (US); Jennifer Wu, Los Altos, CA (US)

(73) Assignee: Alation, Inc., Redwood City, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 17/344,880

(22) Filed: Jun. 10, 2021

(65) Prior Publication Data

US 2021/0390096 A1  Dec. 16, 2021

Related U.S. Application Data

(60) Provisional application No. 63/037,507, filed on Jun. 10, 2020.

(51) Int. Cl.
*G06F 16/00* (2019.01)
*G06F 16/21* (2019.01)
(Continued)

(52) U.S. Cl.
CPC .......... *G06F 16/243* (2019.01); *G06F 16/212* (2019.01); *G06F 16/2455* (2019.01);
(Continued)

(58) Field of Classification Search
None
See application file for complete search history.

(56) References Cited

U.S. PATENT DOCUMENTS

| 10,210,267 B1 | 2/2019 | Lloyd et al. |
| 2009/0192968 A1 | 7/2009 | Tunstall-Pedoe |

(Continued)

OTHER PUBLICATIONS

Dai, Zhuyun and Callen, Jamie, (2019), "Deeper Text Understanding for IR with Contextual Neural Language Modeling," <https://www.cs.cmu.edu/~callan/Papers/sigir19-Zhuyun-Dai.pdf>, (2019), 4 pages.

(Continued)

*Primary Examiner* — Thu Nguyet T Le
(74) *Attorney, Agent, or Firm* — Goodwin Procter LLP

(57) ABSTRACT

A method for querying and analyzing datasets via natural language processing (NLP) with context propagation is disclosed. In one embodiment, a computer-implemented method includes receiving, by a user interface, at least one of an utterance or a structured query language statement. The method includes identifying zero or more previous data conversation steps indicated by the utterance. The method includes determining an effective schema targeted by the utterance. The method includes generating, based on the utterance and the effective schema, an intermediate structured query language statement that is representative of the utterance. The method includes generating an executable structured query language statement based on the intermediate structured query language statement and zero or more previous structured query language statements. The method includes executing the executable structured query language statement for the data query engine schema. The method includes communicating, via the user interface, a result set and metadata.

12 Claims, 3 Drawing Sheets

(51) Int. Cl.
 *G06F 16/242* (2019.01)
 *G06F 16/2455* (2019.01)
 *G06F 16/248* (2019.01)
 *G10L 15/08* (2006.01)
 *G10L 15/22* (2006.01)

(52) U.S. Cl.
 CPC ............ *G06F 16/248* (2019.01); *G10L 15/08* (2013.01); *G10L 15/22* (2013.01)

(56) References Cited

U.S. PATENT DOCUMENTS

| | | |
|---|---|---|
| 2010/0228540 A1 | 9/2010 | Bennett |
| 2017/0083569 A1 | 3/2017 | Boguraev et al. |
| 2017/0242886 A1 | 8/2017 | Jolley et al. |
| 2017/0308571 A1* | 10/2017 | McCurley ........... G06F 16/2428 |
| 2018/0329918 A1 | 11/2018 | Hakkani-Tur et al. |
| 2019/0095478 A1 | 3/2019 | Tankersley et al. |
| 2021/0073336 A1 | 3/2021 | Fox et al. |
| 2021/0150398 A1 | 5/2021 | Bastide et al. |
| 2022/0067037 A1 | 3/2022 | Ranganathan et al. |

OTHER PUBLICATIONS

Devlin et al., "BERT: Pre-training of Deep Bidirectional Transformers for Language Understanding," cite arxiv:1810.04805, (2019), 16 pages.
He et al., "X-SQL: Reinforce Context Into Schema Representation," (2019), 8 pages, https://www.microsoft.com/en-us/research/uploads/prod/2019/03/X_SQL.pdf.
Herzig et al., "TAPAS: Weakly Supervised Table Parsing via Pre-training," arXiv:2004.02349v2 [cs.IR], (2020), 14 pages.
Lan et al., "ALBERT: A Lite Bert For Self-Supervised Learning of Language Representations," ICLR, arXiv:1909.11942v6 [cs.CL], (2020), 17 pages.
Nogueira et al., "Multi-Stage Document Ranking with BERT," arXiv:1910.14424v1 [cs.IR], (2019), 13 pages.
Wang et al., "RAT-SQL: Relation-Aware Schema Encoding and Linking for Text-to-SQL Parsers," arXiv:1911.04942v2 [cs.CL], (2020), 12 pages.
Yu et al., "CoSQL: A Conversational Text-to-SQL Challenge Towards Cross-Domain Natural Language Interfaces to Databases," arXiv:1909.05378v1 [cs.CL], (2019), 18 pages.
Yu et al., "Spider: A Large-Scale Human-Labeled Dataset for Complex and Cross-Domain Semantic Parsing and Text-to-SQL Task," arXiv:1809.08887v5 [cs.CL], (2019), 11 pages.
Zhang et al., "Editing-Based SQL Query Generation for Cross-Domain Context-Dependent Questions," arXiv:1909.00786v2 [cs.CL], (2019), 12 pages.
Zhong et al., "SEQ2SQL: Generating Structured Queries From Natural Language Using Reinforcement Learning," arXiv:1709.00103v7 [cs.CL], (2017), 12 pages.
"The Tableau Data Model", Version 2020.2, dated to Feb. 9, 2022, <https://help.tableau.com/v2020.2/pro/desktop/en-us/datasource_datamodel.htm#star-and-snowflake-schema-analysis>, retrieved on Mar. 31, 2023 from <http://web.archive.org/web/20220209113921/https://help.tableau.com/v2020.2/pro/desktop/en-us/datasource_datamodel.htm>, 11 pages.
International Search Report and Written Opinion for PCT/US2021/036877, dated Sep. 22, 2021.
Lin et al. "Grammar-based Neural Text-to-SOL Generation", arXiv:1905.13326v1 [cs.CL] May 30, 2019. Retrieved on Aug. 16, 2021. Retrieved from <URL:https://arxiv.org/pdf/1905.13326.pdf> entire document.
Screen captures from YouTube video entitled "Google Sheets Explorer," 5 pages, uploaded on Aug. 24, 2017 by user "suresh sood". Retrieved from Internet: <<https://www.youtube.com/watch?v=6uYIQ2hOx30>>.
Screen captures from YouTube video entitled "Tableau—Ask Data," 3 pages, uploaded on Feb. 15, 2019 by user "Cloudstream Partners". Retrieved from Internet: <https://www.youtube.com/watch?v=MV75N9eSnuo>>.
Sukthankar et al. "nQuery—A Natural Language Statement to SOL Query Generator", Proceedings of the 55th Annual Meeting of the Association for Computational Linguistics-Student Research Workshop, pp. 17-23, Aug. 4, 2017. Retrieved on Aug. 16, 2021. Retrieved from <URL: https://aclanthology.org/P17-3004.pdf> entire document.

\* cited by examiner

METHOD AND SYSTEM FOR DATA CONVERSATIONS

CROSS-REFERENCE TO RELATED APPLICATIONS

This application claims priority and benefit from U.S. Provisional Application No. 63/037,507, titled "Method And System For Data Conversations" and filed on Jun. 10, 2020, which is hereby incorporated by reference herein in its entirety.

TECHNICAL FIELD

The present disclosure relates generally to the data analytics field, and more specifically to systems and methods for querying and analyzing datasets via natural language processing (NLP) with context propagation.

BACKGROUND

Data analytics may be leveraged to maximize the value and utility of datasets, where datasets are conventionally stored among a number of computing systems (e.g., in databases, key-value stores, cloud object stores). Typically, such data analytics may be used by an individual or entity (e.g., a company) to broadly understand (i.e., explore) data sets and/or answer potentially complex questions (i.e., analyze data) in order to enhance decision making (e.g., for business decisions). However, current approaches to extract data insights are often challenging. Existing solutions frequently involve a combination of (i) leveraging relatively few specialized technical individuals in conjunction with the manual and time-consuming process of data manipulation in spreadsheets and/or (ii) using conventional tools and systems (e.g., that may include visualization/dashboard-centric offerings) that are too high-level and/or lack the flexibility to easily answer new and potentially complex data questions, perform custom data analyses, or allow custom data exploration e.g., by non-technical individuals. However, critical business stakeholders are often non-technical users who stand to benefit the most from being able to quickly perform broad data explorations and/or deep and meaningful data analyses.

Recently, there has been a steep acceleration in innovations with respect to AI/machine-learning-based approaches to Text-to-SQL translations. Most of such approaches address single question and answer pairs. Some research approaches discuss iterative connected questions, but they are generally focused on carrying over filter conditions from previous questions. To date, efforts to commercialize Text-to-SQL translations are limited and primarily targeted as add-ons to existing analytics commercial offerings. For example, visualization/dashboarding analytic tools have added a natural language interface to facilitate finding dimensions and measures to produce a standard graph or chart in response to a single, simple query.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

A method for querying and analyzing datasets via natural language processing (NLP) with context propagation is disclosed. In one embodiment, a computer-implemented method may include receiving, by a user interface, at least one of an utterance or a structured query language statement. The method may include identifying zero or more previous data conversation steps indicated by the utterance, wherein the zero or more previous data conversation steps comprise at least one of a previous utterance, a previous structured query language statement, a previous result set, or previous step metadata. The method may include determining, based on the utterance and the zero or more previous data conversation steps, an effective schema targeted by the utterance, wherein the effective schema comprises at least one of information from a data query engine schema or columns of one of zero or more previous result sets. The method may include generating, based on the utterance and the effective schema, an intermediate structured query language statement that is representative of the utterance. The method may include generating an executable structured query language statement based on the intermediate structured query language statement and the zero or more previous structured query language statements of the zero or more previous data conversation steps, wherein the executable structured query language query is comprised of a query language dialect of a data query engine. The method may include executing the executable structured query language statement for the data query engine schema. The method may include communicating, via the user interface, a result set and metadata, wherein the result set and the metadata correspond to executing the executable structured query language statement.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of any of the present inventions. As can be appreciated from foregoing and following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

Figure 1A:
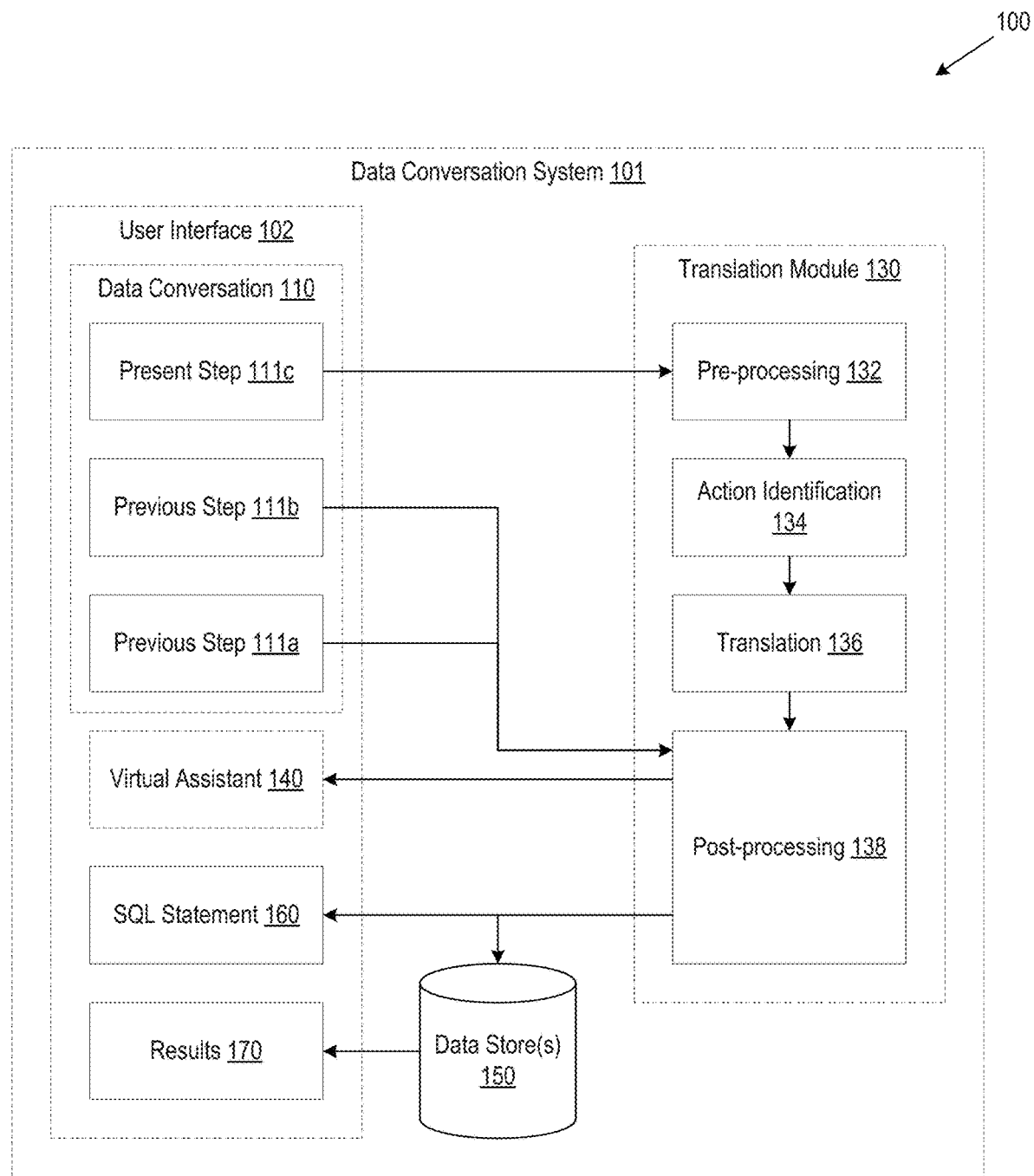
FIG. 1A illustrates an exemplary workflow for a natural language (NL) query at an exemplary data conversation system, according to some embodiments.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

A method for querying and analyzing datasets via natural language processing (NLP) with context propagation is disclosed.

System Overview

In some embodiments, a data conversation system can avoid the limitations of conventional data analytics tools and workflows by enabling users to easily and meaningfully explore and analyze datasets using natural language (e.g., English language) in the form of data conversations. Via data conversations, users may derive data insights (e.g., data correlations, answers to business questions, etc.) from datasets and subsequently leverage the acquired data insights to drive decision making. Further, the ability to use natural language (versus technical query languages such as SQL) as a medium to interact with datasets may enable a broader class of users to interact with datasets in order to extract data insights (e.g., to drive business decisions).

A data conversation may contain a series of one or more data conversation steps that operate within a conversational context. A data conversation step may contain one or more utterances (i.e., natural language queries) and/or one or more structured query language (e.g., SQL) queries directed at one or more datasets. If a data conversation step starts with an utterance (versus a structured query language query), then the utterance is first translated by the data conversation system into a structured query language query. The (translated or directly submitted) structured query language query is executed against the targeted one or more data sets which produces a data result set and metadata for a given data conversation step. The end product of a data conversation may be new data insights from and/or a broader understanding of the data included in the one or more datasets. Accordingly, rather than the use of single queries to analyze datasets (which may be cumbersome (i.e., difficult to author and hard to maintain) and/or imprecise due to language complexities (i.e., difficult to accurately translate)), the present system can enable a user to build complex data analyses using a modular approach that allows for new utterances to leverage previous conversation steps (including utterances and result sets) of a data conversation.

Users may derive insights from a number of data sources through data conversations with their dataset(s), facilitated by the data conversation system's data visualization capabilities for data result sets and feedback and recommendations of a virtual assistant. The present system may provide feedback and recommendations regarding a specific utterance, SQL query, and/or result set within a data conversation (e.g., via a virtual assistant). For example, feedback can allow a user to understand whether their utterance was interpreted as intended and/or facilitate the user in providing another utterance.

In some embodiments, the present system may include a user interface, such that data conversations and resulting data insights may be shared between users. Users may review, modify, and build on top of data conversations saved by other users, facilitating collaboration between users to derive, share, and understand data insights. Technical users (e.g., data analysts) may be able to review, modify, and/or augment existing data conversations shared by users (e.g., business users), which can further improve and accelerate collaboration.

In some embodiments, as described herein, the present system may receive utterances from users as a part of one or more data conversations. The present system may convert such utterances from natural language statements (that include questioning variations found in natural language) to structured query language (e.g., SQL) statements. The present system may query data query engines (e.g., databases) that support structured query languages (e.g., SQL) using the translated utterances from the system. The responses of the present system to the user may include the executable translated structured query language statement, the result of the execution of this structured query language statement, virtual assistant information, and additional information. Through the use of a flexible translation module, the present system may interface with different data query engines that may support different structured query language (e.g., SQL) dialects.

The present system may define an intermediate structured query language (e.g., SQL-like language) that is able to compactly represent the broad and complex functionality of the targeted structured query language (e.g., SQL) and structured query language extensions (i.e., extensions that can incorporate operations on and/or queries against one or more elements of one or more previous data conversation steps) such that language translation from natural language to a targeted structured query language becomes a tractable task for a neural net model. Further, the present system may access sensitive data stored in one or more datasets, and the translation model of the present system may have been trained on sensitive information from multiple customers. In order to avoid spilling sensitive information from one customer to another, the present system may construct intermediate structured query language statements representing an utterance exclusively out of three components that are typically not sensitive in nature. These three components may include: i) tokens in the utterance of the user, ii) information specific to the schema of interest (e.g., column names, join conditions, etc.) or columns derived from previous result sets in the current conversation, and iii) specified (e.g., SQL) keywords. (An intermediate structured query language statement may be subject to further post-processing to generate executable structured query language statements.) Therefore, by construction, the translation model may be restricted from generating queries (e.g., SQL statements) that reveal sensitive data from a different customer or user.

System Architecture

In some embodiments, the data conversation system can include one or more components to enable data exploration and analysis via natural language data conversations. The data conversation system may have one or more computing devices and one or more networks as described herein (See "General Comments"). In some cases, the data conversation system may include a user interface. In some cases, the user interface may include a graphical user interface displayed via one or more display devices. In some cases, the user interface may include a programmatic interface. In some cases, the user interface may include an audio user interface including one or more microphone devices and/or speaker devices. In some cases, the user interface may include a schema view. The schema (e.g., tables and columns) view may be a graphical user interface that displays the data accessible via the data conversation system. The schema view may indicate the columns that may be queried and analyzed by a user. In some cases, not all schema tables and/or columns may be configured to be accessible in the data conversation system (e.g., this could be useful if the schema is very large or if some columns contain unreliable data). In some embodiments, the data conversation system may include a translation module that contains a natural language (NL) interface. The natural language interface may enable a user to interact with datasets via natural language (e.g., English language) data conversations. The translation module may enable a user to build one or more data exploration and/or analysis flows, where a data exploration and/or analysis flow may use previous utterances and their corresponding results as context for new utterances. The translation module may convert received natural language utterances to one or more executable structured query language (e.g., SQL) statements as described herein, wherein a structured query language (e.g., SQL) statement may be executed against one or more datasets stored by one or more data storage platforms.

In some embodiments, the translation module may include one or more subcomponents. The one or more subcomponents may translate the one or more utterances of a data conversation into one or more structured query language (e.g., SQL) statements. In some cases, the translation module may include an action identification component. The action identification component may compare the language included in a received utterance to one or more predefined keywords to determine whether the received utterance is directed to the underlying schema (e.g., tables and columns from a database stored on the data source medium) or referenced result set table(s) and column(s) from previous step(s) of the current data conversation. Translating utterances directed at the latter table and column references may be implemented using Common Table Expressions which are available in many database systems.

In some embodiments, the one or more subcomponents may include a NL translation component. The NL translation component may translate utterances expressed in natural language and data conversation context into one or more intermediate structured query language statements. The intermediate structured query language statements may be constructed so as to: (i) largely be structured query language dialect agnostic, (ii) compactly represent existing standard SQL statements (e.g., 'SELECT', 'COUNT') and (iii) encode system-specific actions that capture a higher-level user intent (e.g., operations on or querying of one or more previous result sets in the data conversation).

In some embodiments, the one or more subcomponents may include a post-processing component. The post-processing component may receive the intermediate structured query language statements from the NL translation component. The post-processing component may convert the intermediate structured query language statements to one or more executable structured query language statements. The executable structured query language statements may interface with a specific database schema either directly and/or through dataset(s) that were returned by previous user utterances in the data conversation (which themselves may be represented as queries on the database schema).

In some embodiments, the data conversation system may include a virtual assistant. In some cases, the virtual assistant may be accessible via a programmatic interface. In some cases, the virtual assistant may be included in the user interface. The virtual assistant may receive from the translation module and communicate to the user: (i) an indication of the confidence level of a translation of an utterance and (ii) which data set(s) were queried, operated on, or used for a query execution. The virtual assistant communication may help the user to validate that the generated query (e.g., SQL statement) accurately reflects the intent of the utterance.

In some embodiments, the data conversation system may include a retraining module. The retraining module may enable a model retraining workflow based on a user indicating that a specific utterance was not translated by the data conversation system as intended by the user.

In some embodiments, the data conversation system may include a collaboration module that enables sharing of data conversations between users or groups of users. The collaboration module may be accessible via a programmatic interface of the data conversation system. The collaboration module may be accessible via the user interface of the data conversation system. The collaboration module may present a user workflow to save, annotate, edit, and replay one or more data conversations. Data conversations may be shared and/or repeatedly accessed for the purposes of (i) acting as a starting point for further data analysis; (ii) reviewing and/or editing the analyses generated by other users; (iii) sharing data insight results with other stakeholders; and (iv) monitoring data trends in a manner similar to dashboards (e.g., saving and replaying a series of graphs with up-to-date data).

As described herein, technical users (e.g., data analysts) may review data conversations (e.g., via the user interface). In some cases, technical users (e.g., data analysts) may manually correct data conversations by editing the system generated queries (e.g., SQL statements) in order to achieve a result intended by a user or users that created the data conversation.

Translation Module Workflow in a Data Conversation System

In some embodiments, the data conversation system may include the capability to translate utterances (received from a user input) and the conversation context to structured query language queries (e.g., SQL statements) via the translation module. In some cases, a user may input a structured query language query (e.g., SQL statement) directly to the data conversation system (e.g., via the user interface), but typically, a user will input at least one utterance in the context of a data conversation, where the at least one utterance may be parsed, translated, and executed against the relevant data by the data conversation system. FIG. 1A illustrates an exemplary workflow 100 for an utterance at an exemplary data conversation system 101, according to some embodiments. The workflow 100 may include one or more components of the data conversation system 101 as described herein. For example, as shown in FIG. 1A, the workflow 100 may include the user interface 102, the translation module 130, and the virtual assistant 140. In an example, the user interface 102 may be accessed and/or otherwise displayed via a web browser. In some cases, the user interface 102 may display one or more data conversations 110. In some cases, the data conversation 110 may include one or more conversation steps 111, where each step in 111 may include an utterance, a (e.g., SQL) query (e.g., resulting from the translation of the utterance), a data result set from query execution, and/or associated conversation step metadata (e.g., step name, step number, annotation, virtual assistant feedback, etc.). The one or more steps 111 may include one or more previous steps (e.g., 111a and 111b) and/or present steps (e.g., 111c). For example, as shown in FIG. 1A, the data conversation 110 may include previous steps 111a and 111b and present step 111c. A previous step may include an utterance (i.e. NL query), a structured query language query (e.g., SQL statement) generated based on the utterance or directly input by a user, results corresponding to the query execution, and/or conversation step metadata. A present data conversation step may include an utterance or a query (e.g., SQL statement) input by a user. In some cases, steps 111 may be displayed via the user interface 102 as a part of a data conversation 110. In some cases, steps 111 may be accessed and/or otherwise used by the translation module 130. For example, a SQL statement associated with the previous step 111b may be used in by a post-processing layer 138 as to be described herein.

In some embodiments, the workflow 100 may begin with a present data conversation step 111c, where the present conversation step 111c may include an utterance (or a SQL statement). A user may input an utterance at the user interface 102 (e.g., via a microphone or keyboard). A user may also input a structured query language query (e.g., SQL statement) in place of an utterance. In some cases, the utterance or query of the present step 111c may be displayed in the data conversation 110 at the user interface 110. The utterance or query may be directed at data accessible by the data conversation system 101 (e.g., at data store(s) 150). As described herein, the data available for query by a user may be presented via a schema view at the user interface 102.

In some embodiments, the utterance originating from the present step 111c may be communicated and/or otherwise input to the translation module 130. The translation module 130 may include one or more layers. In some cases, in the workflow 100, the translation module 130 may execute pre-processing of the utterance submitted in the present step 111c at a pre-processing layer 132. In some cases, the pre-processing layer 132 may determine whether the utterance includes one or more references to any steps 111 included in the data conversation 110 (e.g., previous step 111a or 111b). In some cases, the pre-processing layer 132 may remove one or more unnecessary tokens (e.g., words) from the utterance and/or identify higher-level actions indicated by keyword(s) in the utterance as to be described herein. Based on the operation of the pre-processing layer 132, the workflow 100 may proceed to the action identification layer 134, where the translation module 130 may execute schema identification 134 for the utterance. The action identification layer 134 may determine the schema (e.g., included in data store(s) 150) and/or the result set(s) from previous steps (e.g., previous steps 111a and/or 111b) on which to operate, query, and/or use. If the result set(s) of one or more previous steps (e.g., previous steps 111a and/or 111b) is/are selected as data source(s) for the utterance, the action identification layer 134 may determine the column(s) and/or table(s) in the referenced result set(s) to be encoded as the effective schema for the utterance. If a schema (i.e., table(s) and/or column(s) of datasets stored by the data store(s) 150) is selected as the data source for the utterance, the action identification layer 134 may determine the associated schema information to be encoded as the effective schema.

In some embodiments, based on the operations of the action identification layer 134, the workflow 100 may proceed to the translation layer 136, where the translation module 130 may translate and/or otherwise convert the processed utterance (e.g., from the pre-processing layer 132), keyword(s) (e.g., from the pre-processing layer 132), and effective schema (e.g., from the action identification layer 134) to an intermediate SQL-like statement having characteristics as described herein. In some cases, the translation layer 136 may determine an estimated accuracy of the translation which can be based on the aggregated and/or individual token probabilities that are generated by the translation module 136.

In some embodiments, based on the operations executed in the translation layer 136, the workflow 100 may proceed to the post-processing layer 138, where the translation module 130 may generate an executable query (e.g., SQL statement(s)) based on the intermediate SQL-like statement (e.g., from the translation layer 136) and generate feedback for communication (e.g., display) by a virtual assistant 140. The post-processing layer 138 may convert the intermediate SQL-like statement to an executable query (e.g., SQL statement). For example, in some cases, the post-processing layer 138 may include operations involving derivation and insertion of From/Join and/or Group-By expressions in the executable SQL statement, as explained in the post-processing section below. The post-processing layer 138 may adjust formatting of the intermediate structured query language statement and/or the executable query (e.g., SQL statement) based on the specific database type(s) of the schema that is/are the target of the executable query (e.g., SQL statement). To generate the executable query (e.g., SQL statement), the translation module 130 may assemble a structured query language statement using previous structured query language statement(s) (e.g., from previous step 111a or 111b) as subcomponents. Such assembly may occur using Common Table Expressions as to be described herein. In some cases, the translation layer 130 may communicate the translation confidence to the virtual assistant 140 for communication (e.g., display at the user interface 102).

In some embodiments, based on the operations of the post-processing layer 138, the data conversation system 101 may display the generated query (e.g., SQL statement) 160 at the user interface 102. The query (e.g., SQL statement) 160 may be included with the utterance of the present step 111c. In some cases, the data conversation system 101 may execute the query (e.g., SQL statement) 160 provided by the post-processing layer 138 against the encoded schema (e.g., at the data store(s) 150). In some cases, as shown in FIG. 1A, the encoded schema may include one or more table(s) and or column(s) stored among one or more data stores 150. Additionally or alternatively, the encoded schema may operate on or query against result set(s) from previous steps (e.g., previous steps 111a and 111b) of the data conversation 110. The data conversation system 101 may display the results 170 from the execution of the SQL statement 160 at the user interface 102. In some cases, the results 170 may be included with the utterance of the present step 111c. In some cases, the results 170 may be displayed with graphing options, data table views, relevant data filters, and/or an annotation capability. In some cases, the data conversation system 101 may display the virtual assistant feedback generated by the post-processing layer 138 via the virtual assistant 140. As described herein, the virtual assistant feedback may include a confidence level (e.g., numerical or categorical) for the translation produced by the translation module 130 and an indication of whether a previous step (e.g., previous step 111a or 111b) in the data conversation 110 was queried, operated on, or used based on the present step 111c. In some cases, the virtual assistant feedback may include an explanation of the translated query (e.g., SQL statement) 160 in understandable terms (e.g., for a non-technical user). As described herein, the data conversation system 101 may include a retraining module and/or a collaboration module (not shown).

Context Propagation

In some embodiments, context propagation within the data conversation system 101 may be the ability to refer to previous earlier conversation steps (including the query results) within a data conversation and use such referenced conversation steps as building blocks for subsequent analysis (i.e., data conversation) steps. To arrive at a data insight from a data analysis workflow (e.g., workflow 100), a user may need to leverage context propagation when operating, querying, and or using previous conversation steps such as when combining two result sets filtering by result sets, and/or perform consequent determinations (e.g., queries, calculations, etc.) on previous result sets. As an example, the present step 111c may be directed at the results of the previous steps 111a and 111b. The context propagation concept of the data conversation system 101 may enable meaningful data analysis and exploration through the generation of complex queries that are built on top of one or multiple conversation steps.

In some embodiments, as an example, a user may desire an answer to the following business question: "correlate the total sales per year in each region with the average regional unemployment numbers", where the schema may contain a table with sales information including the close date, the sale amount and the region, and another table may contain the region and the average unemployment number for each month. To answer the above business question, an example data conversation may include four steps. For reference purposes, an utterance (i.e., NL query) from a user may be described in quotations below, while step names may be indicated by an arrow adjacent to each utterance:

Step 1: "What are the total sales per region and year-?"→sales per region

Step 2: "Show me the average unemployment per year in each region."→unemployment per region Step 3: "Combine {sales per region} and {unemployment per region}."→sales and unemployment per region Step 4: "what is the [sum_sales/avg_unemployment as sales_unemployment_ratio] per year using Step 3"

As described above, it may be challenging for a system that lacks data conversation and context propagation capabilities to support answering the above business question. Depending on the underlying structure of the data, answering the business question may involve multiple queries of different query types, and a translation model may not be able to generate an entire representative query sequence. Additionally, if such a data analysis were presented in a single step, users may find it difficult to validate the correctness of the answer. In contrast, with context propagation, the validation of intermediate results from multiple steps while forming the data analysis may be significantly more tractable.

In some embodiments, as described herein a user may not be required to repeat query elements that have already been stated in previous steps of a data conversation. A user may reuse the context (including query results) from previous steps, which may be referred to as a higher-level actions. In some cases, the data conversation system 101 may support context-based higher-level actions. As an example, context based higher-level actions may include utterances requesting to drop or rename columns from a previous result set. Through use of NL to structured query language (e.g., SQL statement) translations and higher-level actions, the data conversation system 101 may support a wide breadth of language and problem coverage that may be applied for industry data analysis and exploration use cases.

Translation Workflow

In some embodiments, as described herein, the translation module 130 may enable a data conversational experience that supports complex data analysis through application of broad language support for both NL (e.g., English) utterances and structured query language (e.g., SQL) queries. Utterances (e.g., utterance 114) that are input to the translation module 130 may be grammatically broad and relatively unconstrained, allowing for fluid linguistic expression of questions and understandable data analyses. The translation module 130 may also allow for usage of custom mathematical calculations, where the calculations may either be pre-defined or generated by a user within the utterance. In some cases, the translation module 130 may allow a new utterance to operate on, query, and/or use previous results.

Figure 1B:
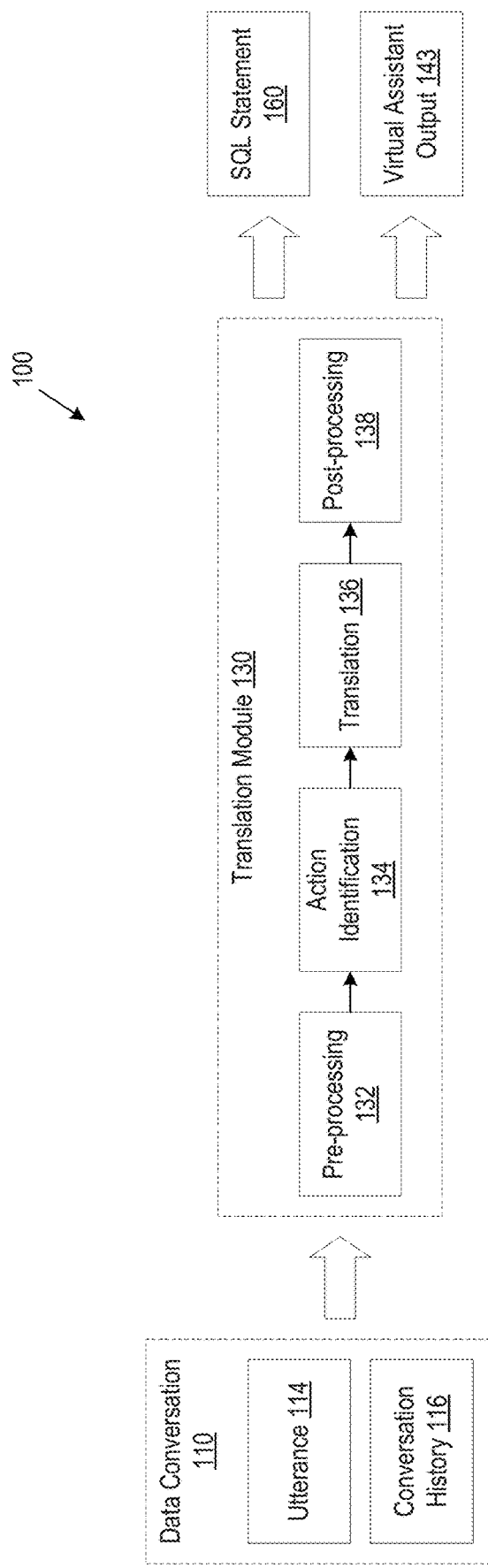
FIG. 1B illustrates an exemplary workflow for a natural language (NL) query at an exemplary data conversation system, according to some embodiments.

FIG. 1B illustrates an exemplary high-level workflow 100 for a NL utterance at a data conversation system 101, according to some embodiments. The data conversation 110 may include a conversation history 116, which may include previous steps (e.g., previous steps 111a and 111b) as described herein and an utterance 114, the current step. In some cases, the translation module 130 may receive an utterance 114 (e.g., from step 111c) and the relevant context of the ongoing data conversation 110 as an input. The context may also include metadata of previous step results (e.g., column names and/or column data types). In the translation layer 130, the utterance 114 and the context information may be processed by a pre-processing layer 132, an action identification layer 134, a translation layer 136, and a post-processing layer 138. The translation module 130 generates a query (e.g., SQL statement) 160 as described herein. In some cases, the translation module 130 may also generate the relevant information for the virtual assistant output 143 (e.g., at the virtual assistant 140) as described herein.

Schema Encoding

In some embodiments, the schemas in the data store(s) 150 may be encoded by the data conversation system 101 for reference by the translation module 130. In some embodiments, the schema encodings may be stored in configuration files or in a separate database system. In some cases, encodings may include (a subset or all) schema columns, custom calculations, join-conditions, private/foreign key relationships, and more. In some cases, a column may be identified by a table name and column name, e.g., "<table>.<column name>". A column may be encoded to include a corresponding 'model name' and/or a format. This model name of the column may indicate the meaning of the column, and it may also be used by the translation model 130 to represent the column. A format may indicate a data type for the column which can be useful for correct post-processing in layer 138.

In some cases, a column encoding may include a preferred name for how the column in the result set should be displayed. For example, should the column 'accounts.id' be associated with a preferred renaming-name 'account_id', then the post-processing layer 138 may replace a "SELECT accounts.id, . . . " in the intermediate structured query language statement with "SELECT accounts.id AS account_id, . . . ".

In some embodiments, custom calculations may be pre-defined and stored as a custom column in the schema encoding. In this case, the corresponding structured query language (e.g., SQL) calculation and the model name that the custom column represents need to be specified. For example, a custom calculation may be defined and stored in a schema encoding as follows:

```
column: '_custom_age'
- model name: 'age'
- definition: "(LEAST(to_date(opportunities.close_date,
  \'YYYY-MM-DD\'),
  NOW::DATE) - to_date(opportunities.create_date,
  '\YYYY-MM-DD\'))"
```

In some cases, private and/or foreign key relationships may be defined in the schema encoding leveraged by the translation module 130. By referring to these private/foreign key relationships, the post-processing layer 138 may prevent double-counting of data values. As an example, if an account table is joined to an opportunities table where each account could map to multiple opportunities (with an attribute 'stage'), the translation of an utterance like "how many accounts have opportunities in stage 6" will require a 'DISTINCT' SQL keyword. Private/foreign key relationships may help to identify these situations.

In some cases, join-conditions may be defined in the schema encoding. Pre-defining the join-conditions may be required to construct the JOIN clauses for the SQL statements. The join-conditions may be configured by an administrator of the data conversation system 101 based on the guidance of the user's database administrator.

Pre-Processing Layer

In some embodiments, as described herein, the translation module 130 may include a pre-processing layer 132 configured to prepare user input(s) and utterance context for input to subsequent layers of the translation model 130. In some cases, an utterance 114 may include an ad-hoc custom calculation, which may enable users to perform complex mathematical operations on a previous result set using mathematical operations expressed as SQL phrases. As an example, a previous result set (e.g., the result of Step 3) may contain the sales amount and the quota for each account executive per quarter. An ad-hoc custom calculation may then be defined to determine an achievement ratio for each account representative. The ad-hoc custom calculation may be calculated by inputting the following utterance: "Using Step 3, what is the [sum(amount)/sum(quota) as achievement ratio] per account representative?" To process the ad-hoc calculation, the pre-processing layer 132 may extract the calculation and the metric name from the utterance 114. The calculation and the metric name may then be encoded in a temporary schema along with the columns of the result set from Step 3 in the basic action identification Layer 134, following the schema encoding approach outlined above.

As discussed below, the language pattern 'using Step 3' may identify that this temporary schema is the one that the to-be-generated structured query language SQL statement should be executed on, i.e., the translation layer 136 and the post-processing layer 138 may use this temporary schema to generate the structured query language statement.

Basic Action Identification Layer

In some embodiments, the action identification layer 134 of the translation module 130 may further parse the utterance 114 for predefined language patterns that may then be used to inform the intermediate SQL generation in the translation layer 136, or even generate the executable SQL for some simple patterns. In some cases, one or more the following predefined patterns may be implemented:

TABLE 1

Sample Language Patterns in Action Identification Layer

| Language Pattern in Utterance 114 | Example | Resulting Action |
| --- | --- | --- |
| 'using Step N' | 'using Step 3, show me the total sales by region' | The column names in the result set for Step N may be used as the schema columns in the translation layer |
| 'combine' with mention of Step N and Step M | 'combine step 1 and step 3' | A SQL for an inner join may be created as described below |

Table 1 may describe example language patterns and the example resulting actions. The 'N' in "Step N" may be representative of a step numeral.

As indicated in Table 1, in some implementations, if a predefined key phrase such as 'using Step N' is expressed in the utterance 114, this communicates the user's intent that the previous Step N is the target of the question. A temporary schema encoding may be constructed by the action identification layer 134 that encodes now the column information of the result set of Step N in the same way as the schema encoding encodes the database schema, i.e., one may interpret the result set columns of the result set as a simple temporary schema consisting of one table This temporary schema encoding may then be used by the translation layer 136 to construct an intermediate SQL that may aim to query this temporary table. The post-processing layer 138 may then convert the intermediate SQL into an executable SQL statement 160 that can be executed against the underlying schema. The last step may include reinserting the executable SQL statement of Step N. If the action identification layer 134 does not identify the need to construct a temporary schema encoding based on a referenced step, the translation layer 136 and the post-processing layer 138 may use the schema encoding of the underlying database schema to translate the utterance 114 as described herein.

In some embodiments, another exemplary language pattern that may be implemented is shown in the second row in Table 1. A language pattern using the keyword 'combine' in conjunction with referencing two previous steps may trigger the generation of an executable SQL statement by the action identification layer 134. The SQL statement may implement an inner join of the referenced steps where the join columns may be the columns that appear in both referenced result sets. The translation layer 136 and the post-processing layer 138 may then be bypassed, as the executable SQL has already been constructed.

Translation Layer—Encoder

In some embodiments, as described herein, the translation module 130 may include a translation layer 136. To translate an utterance in the schema context as identified in the action identification layer 134 to an intermediate SQL statement, the translation layer 136 may use an encoder/decoder-like framework. The utterance 114 (and other relevant information like columns and intermediate SQL keywords) may be encoded into a set of vectors by an encoder of the translation module 130. The intermediate SQL statement may then be generated by a decoder of the translation module 130 based on the encoded vectors.

Figure 2:
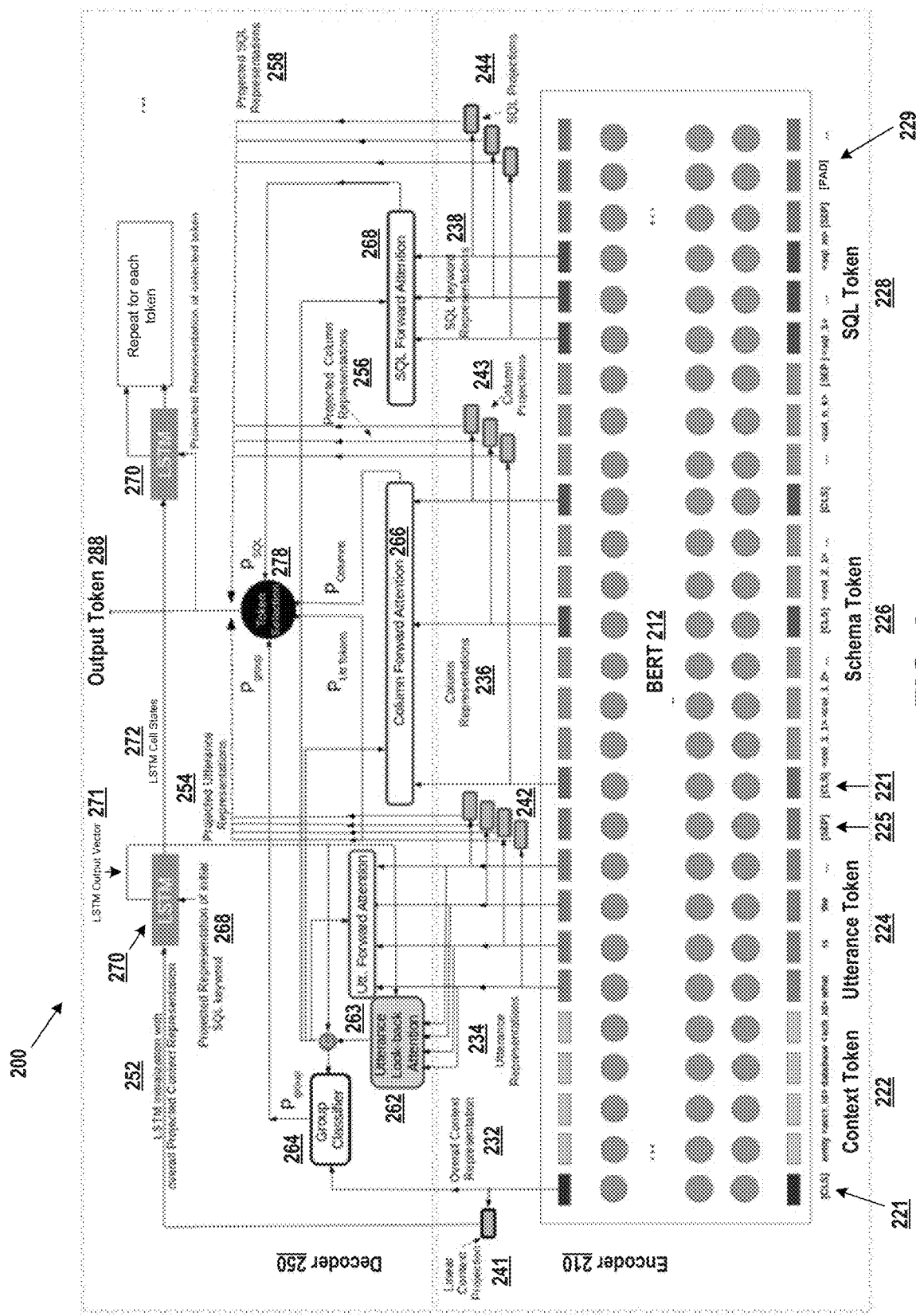
FIG. 2 illustrates an exemplary translation layer comprising an exemplary encoder and an exemplary decoder, according to some embodiments.

FIG. 2 illustrates an exemplary translation layer 200 comprising an exemplary encoder 210 and an exemplary decoder 250, according to some embodiments. In some embodiments, a first layer of the encoder 210 may be based on Bidirectional Encoder Representations from Transformers (BERT), as described by "BERT: Pre-training of Deep Bidirectional Transformers for Language Understanding". In other cases, the first layer of the encoder 210 may be based on techniques and approaches somewhat similar to BERT, like DistilBERT, T5 or Tapas, or their underlying architectures.

The encoder 210 may tokenize NL inputs (e.g., an utterance 114) using the tokenizer of the BERT model 212 to generate the input tokens. In some cases, the input to the tokenizer may include the utterance, the schema columns from the identified schema context (or their model names, as specified in the schema encoding), and possibly the SQL keywords from the intermediate SQL token list (see discussion below and FIG. 2). The input may also contain additional contextual information that may help the translation 136 to do a more accurate translation specific to a customer, database type, or other.

In some embodiments, a sample tokenized input may include:

- The standard BERT [CLS] starting token (221)
- Tokenization 222 of contextual information, which may in some embodiments include a string of the form 'entity <acct_id> database <sch_id>', where <acct_id> may be a numerical identifier of the customer and <sch_id> may be a numerical identifier of the database schema.
- Tokenization 224 of the utterance, followed by a separator token [SEP] (225) which may indicate separation of token categories
- Tokenization 226 of model column names as configured in the schema encoding, where each tokenized model name may be preceded by another [CLS] token. (In FIG. 2, <col_n_k> refers to the k-th token of the n-th column model name, as each column name may produce more than one token when it is tokenized. As an example, an actual column 'accounts.registered_name' which may be associated in the schema encoding with the model name 'account name', may then be tokenized as [CLS], 'account', 'name'.
- A [SEP] token separating signaling the end of the column section
- Tokenizations 228 of all intermediate SQL keywords in the intermediate SQL list, followed by a final [SEP] token which may again signal the end of a section of tokens.
- A number of padding tokens [PAD] (229) to fill the sequence to ensure equal length of all inputs. For example, if the configured standardized length of input tokens is 100, but there are only 60 input tokens used so far, 40 [PAD] tokens 229 may be added to the end of the existing input tokens, such that there are 100 input tokens in total.

BERT may produce context-based output representations for each input token Specifically, there may be representations for:

- the initial [CLS] token (232)
- each utterance token (234)
- each [CLS] token associated with a column (236)
- each intermediate SQL keyword (238)

Additionally, the encoder 210 may produce lower-dimensional representations for those tokens which in some embodiments may be the results of multiplying the full representations by matrices with the dimensions that are suitable for the decoder. For example,

- the dimensional reduced representation (252) of the initial [CLS] token may be obtained by multiplying representation 232 with a matrix $W_{CLS}$ 241.
- the dimensional reduced representation (254) of each utterance token may be obtained by multiplying representation 234 with a matrix $W_{utterance}$ 242
- the dimensional reduced representation (256) of each [CLS] token associated with a column may be obtained by multiplying representation 236 with a matrix $W_{columns}$ 243
- the dimensional reduced representation (258) of each intermediate SQL keyword may be obtained by multiplying representation 238 with a matrix $W_{SQL}$ 244

In some embodiments, 'bert-base-uncased' may be used as the pre-trained embedding model and the dimension of the representation vectors 232, 234, 236, and 238 may be 768d.

In some embodiments, each of the matrices $W_{CLS}$, $W_{utterance}$, $W_{columns}$, and $W_{SQL}$ may have the same dimensions, as their primary purpose may be to produce representations of a suitable dimension for the Decoder 250. (A secondary purpose may be to transform the representations 232, 234, 236, and 238 differently for each of those four types.) In some cases these matrices may have dimensions of 768×200.

Translation Layer—Decoder

In some embodiments, the decoder 250 may include a neural network (e.g., a recurrent neural network). The neural network may include long-short-term memory (LSTM) architecture 270 with one or more layers. Using the neural network, the decoder 250 may predict (e.g., iteratively predict) one or more intermediate SQL output tokens 288 that form an intermediate SQL statement.

Before predicting the first intermediate SQL output token 288, the LSTM architecture 270 may be initialized with the projected context representation 252 for the cell state 272. The first input to the LSTM cell 270 could be the dimensionally reduced embedding of a 'start' token, which could be part of the Intermediate SQL keyword set (See below). In some embodiments, this start token may be represented through an unused BERT token, e.g., [unused99].

In some embodiments, the prediction of the respective next intermediate SQL output token may be implemented as follows:

With the hidden LSTM state from the previous output token prediction step (or, for the first output token prediction step, with the initialization above) and the dimensionally reduced representation of the previously predicted SQL output token (or, for the first prediction step, the suitable representation of the 'start' token) as input, the LSTM architecture 270 may generate at a given output step an output vector 271. An utterance look-back attention module 262 (as shown in FIG. 2) may then be implemented that uses the output vector 270 and the utterance representations 234 to generate an attention vector and one or more attention weights. For example, the attention vector and attention weight(s) may be generated using a standard dot-product attention calculation between the output vector 271 and the utterance representations 234. The purpose of the utterance look-back attention module 262 may be to provide additional contextual information regarding what part of the utterance may be most relevant for the current prediction step. In some embodiments, a group classifier 264, utterance forward attention module 263, column forward attention module 266, and SQL forward attention module 268 may model the likelihood $p_{group}$ of a specific token group for the predicted token (e.g., utterance token, column token, or intermediate SQL keyword token), and ii) the likelihoods $p_{utt-forward}$, $p_{columns-forward}$, and $p_{SQL-forward}$ (collectively referred to as $p_{token-within-group}$) which token within the respective token group may be the correct one. The final token prediction may then be based on which token has the highest overall likelihood amongst the token probabilities p(token) calculated as:

$$p(\text{token}) = p_{group} * p_{token\text{-}within\text{-}group}$$

As an example, should the group classifier 264 predict that the correct token has a 75% chance to be a token referring to a column and the classifier for the column selection would predict that within the columns the third column has a chance of 80% to be the correct one, then the overall likelihood that the 3rd column is the correct next SQL output token is $$p(\text{3rd-column}) = p_{group}(\text{'columns'}) * p_{columns\text{-}forward}(\text{3rd-column}) = 75\% * 80\% = 60\%$$

In some embodiments, the three 'forward-attention modules', 263, 266, and 268, that make the predictions of individual token likelihoods within each of the three respective token groups may be implemented as follows: the concatenation of the attention vector from the utterance look-back attention model and the LSTM output vector 271 may be used for a standard dot product attention calculation now with respect to the representations of the tokens in the class, where the calculated attention weights for each token correspond to its predicted probabilities. In some cases, the concatenated vector may be multiplied by matrices $W_{utt\text{-}forward}$, $W_{columns\text{-}forward}$, or $W_{SQL\text{-}forward}$ respectively to match the dimension of the respective token representations. (The elements of these matrices are trainable parameters.)

In some embodiments, the group classifier 264 may be modeled as a very similar attention calculation as outlined above, where the vector resulting from the concatenation of the attention vector from the utterance look-back attention module 262 and the LSTM output vector 271 may attend over three separate projections of the context representation 232. The resulting three attention weights may be interpreted as the three group probabilities. (All weights used in matrices in this section may be trained during the translation model training.)

In some embodiments, the intermediate SQL statement may be generated by following the above procedure that generates the intermediate SQL output tokens one by one, each time choosing from either an utterance token, a schema column, or intermediate SQL keyword described below. A beam-search approach may be used in some embodiments.

Intermediate SQL

In some embodiments, intermediate SQL as described herein may be an abstracted universal (or near universal) SQL format, i.e. a language format that may be largely database agnostic and broadens the purpose to also align with a conversational context. The keywords used in the intermediate SQL grammar may consist of i) standard SQL keywords (e.g., 'SELECT', 'COUNT') and ii) keywords that encode higher-level actions mirroring a user intent that may refer back to previous steps in the conversation history 116 (e.g., 'DROP' as in 'drop column cars using step 4'). The intermediate SQL may extend a standard SQL grammar by incorporating actions that refer to broader user intent that may not be part of a standard SQL vocabulary. The action(s) encoded in these extensions may be translated into executable SQL output during a post-processing operation as to be described herein. In some cases, action(s) indicated in an utterance may function to operate on previous steps (e.g., previous steps 111a and 111b) of a data conversation (e.g., data conversation 110). Table 2 below lists example utterance keywords, their actions (i.e. meanings), and their corresponding intermediate SQL encodings generated by the translation layer 136.

TABLE 2

Example Intermediate SQL Mappings

| Intermediate SQL Keyword | Action | Utterance Example | Intermediate SQL Encoding Example |
|---|---|---|---|
| year, month, day, hour, etc. | extracting a time group | "show the total amount by year of close" | SELECT YEAR(opportunities.create_date), SUM(opportunities.amount) |
| drop | drop a column | "drop stage using step 4" | SELECT DROP (stage) |
| call | rename columns | "rename sum_amount to amount in Step 3" | SELECT CALL (sum_amount, amount) |
| [unused99] | start token (auxiliary) | [This token is introduced automatically at the beginning of the Decoder input.] | n/a |
| [unused101] | end token (auxiliary) | [This token is added automatically at the end of the generated SQL statement] | n/a |

In some cases, to align more with the pre-training tasks of pre-trained language models like BERT, it may be useful to replace some intermediate SQL keywords with more natural language terms. As an example, the following SQL keywords may be encoded as a corresponding NL word: DESC—descending, ASC—ascending, AVG—average. Additional encodings may occur for other standard SQL tokens. The post-processing layer 138 described herein may then re-insert the proper SQL keywords as needed.

Post-Processing

In some embodiments, as described herein, the translation module 130 may include a post-processing layer 138. The post-processing layer 138 may convert the intermediate SQL statement from the translation layer 136 to an executable SQL statement that can be executed against the underlying database schema directly and/or previous result set(s) in the conversation context (which may be expressed as executable SQL statements against the underlying database schema themselves). The tasks that the post-processing layer 138 may need to accomplish may include:

- insertion of 'FROM' and 'JOIN', if the translation layer 136 did not generate them.
- conversion of intermediate SQL keywords that do not directly correspond to a standard SQL token (e.g., 'YEAR', 'DROP', etc.)
- inserting the executable SQL statements of referenced step as appropriate In some cases, the post-processing layer 138 may reconstruct and insert one or more from/joins clauses. In some embodiments, this may be accomplished by determining the tables that contain the columns used in the intermediate SQL statement. Using those tables and the preconfigured join statement(s) in the schema encoding as needed, the post-processing layer 138 may then construct the FROM/JOIN clause(s) and insert the clause(s) in the SQL statement.

In some cases, in the post-processing layer 138, a group-by clause may be generated based on the use of aggregated and non-aggregated columns in the intermediate SQL statement. This can be achieved by analyzing the use of generated based on the use of aggregated and non-aggregated columns in the SQL statement. In some implementations this can be achieved by 1) determining whether there are any aggregations in the SQL statement, if so 2) add a GROUP-BY clause for any non-aggregated column in SELECT and WHERE clauses.

In some cases, using the private/foreign key relationships defined in the schema encoding, the post-processing layer 138 may insert the SQL keyword "DISTINCT" (or equivalent operations) into the SQL statement to avoid counting values more than once.

Converting intermediate SQL statements with the intermediate SQL keyword extensions into executable SQL clauses may in some embodiments be accomplished by parsing the intermediate SQL statements and then constructing the appropriate clauses for the executable SQL statements. The schema encoding may be referenced for this construction. The complexity of the construction process may vary depending on the specific keyword used. For example, for some keywords that may extract time components of dates (e.g., 'Year', 'Month'), the construction may be straightforward and the only complexity may be in the proper conversion for a particular structured query language dialect. An example could be:

Year(accounts.create_date)→LEFT(accounts.create_date, 4)

where the column accounts.create_date was assumed to be in string format.

In other cases, the executable SQL construction may be more complex. Consider, for example, the case of 'Drop'. The overall flow for a specific example may be:

1) assume that step 3 contains a result set with a number of columns, including a column named 'stage'
2) the new utterance in step 4 is "remove stage in step 3"
3) the effective schema identification layer 134 may identify the result set of step 3 as the correct target for the intermediate SQL and constructs a temporary effective schema which may be based on the column names of the result set of step 3
4) The translation layer 136 may in some embodiments translate the utterance for the effective schema to the following intermediate SQL statement: "SELECT DROP(stage)"
5) The post-processing layer 138 in some embodiments may:
   i) identify the extended SQL keyword 'Drop'
   ii) use the columns of the effective schema to construct a SQL clause that selects all columns except for column 'stage'
   iii) combines the newly constructed clause with the executable SQL statement of step 3 to construct the executable SQL statement for step 4, which in some embodiments may be done using Common Table Expressions.

As an example, the post-processing layer 138 may execute the following conversion from an intermediate SQL statement to an executable SQL statement:

Submitted Utterance:

"how many won opportunities were created for each account last year"

Intermediate SQL Statement:

```
SELECT account.id, COUNT (opportunities.id)
  WHERE YEAR(opportunities.create_date) =
  YEAR(NOW MINUS INTERVAL 1 YEAR) AND
  opportunities, stage ='won'
```

Executable SQL Statement:

```
SELECT account.id AS account_id,
  LEFT(opportunities.create_date, 4) AS year_create_date,
    COUNT(opportunities.id) AS count_opportunity_id
    FROM opportunities
  JOIN accounts on accounts.id = opportunities.account_id
  WHERE opportunities.create_date IS NOT NULL
  AND LEFT(opportunities.create_date, 4) = LEFT
    (to_char(NOW( ) - INTERVAL '1 YEAR', 'YYYY'), 4)
  AND opportunities.stage = 'won'
  GROUP BY LEFT(opportunities.create_date, 4), accounts.id
```

Another example illustrating the reference to an earlier result set in the conversation history 116 could be:

Submitted Utterance:

"Using Step 3 what is the average amount per region"

Intermediate SQL Statement:

SELECT region, AVERAGE(sum amount)

Executable SQL Statement:

```
WITH t0 AS (<executable SQL statement of Step>)
SELECT region AS region, AVG(sum_amount) as avg_sum_amount
FROM t0
GROUP BY region
where the result set of Step 3 was assumed to contain columns named 'region' and 'sum_amount'.
```

Model Training

In some embodiments, if the translation layer 136 of the translation module 130 is based on a machine learning/neural net architecture, the translation layer 136 may be trained. The translation layer 136 may be trained using one or more training datasets.

Training examples may be pairs of natural utterances and matching intermediate SQL statements, combined with additional meta-data. An example could be:

Utterance:

"how many won opportunities were created for each account last year")

Intermediate SQL Statement:

```
SELECT account. id, COUNT(opportunities.id)
  WHERE YEAR(opportunities.create_date) =
  (NOW MINUS INTERVAL 1 YEAR)
  AND opportunities.stage ='won'
  - Schema columns with their model name, and
  maybe additional schema meta-data information
  (e.g., private/foreign keys, data types.)
```

Note that in some embodiments, the intermediate SQL statements may not need to include any SQL clauses which can be reconstructed during the post-processing phase 138. Examples could be the FROM/JOIN clauses, which can be inferred from the columns used in the intermediate SQL statement and the predefined join conditions in the schema encoding, or GROUP BY clauses which can be reconstructed from used aggregated and non-aggregated columns.

In some cases, a training dataset may contain public data sets, like the WikiSQL dataset as described in "SEQ2SQL: GENERATING STRUCTURED QUERIES FROM NATURAL LANGUAGE USING REINFORCEMENT LEARNING". The data in these datasets may be transformed into a format that is suitable for the present's system translation layer 136.

In some cases, a training data set may include a custom dataset that focuses on one or more specific schemas of interest which also may emphasize intermediate SQL expressions that may be absent from the WikiSQL dataset as described herein. Examples of the latter could include intermediate SQL statements that use one or more of the first four keywords in Table 2.

To generate custom training examples at scale, it may be useful to auto-generate training examples from one or more parameterized utterance/intermediate SQL pairs. A script may iterate over these pairs and information in the schema encoding (or elsewhere) and substitute the parameters with actual values for columns, etc. This may result in many system-generated utterance-intermediate SQL pairs that may augment the training examples.

The overall training set may include one or more (e.g., tens of thousands) of training examples. In some embodiments, the training phases may also be split into an initial phase where the translation model 136 is trained on a broad training set and a subsequent fine-tuning phase where the translation layer 136 is further trained on a smaller training set with custom examples that may be more specific to the particular problem of interest.

In the BERT-based encoder/decoder architecture discussed herein that implements the translation layer 136, parameters (e.g., all parameters) in the pre-trained BERT model 212 in the Encoder 210 may be re-trained, and other parameters (e.g., all other parameters), including those in the referenced W matrices and those in the LSTM cells 270, may be trained from random initializations.

General Comments

Measurements, sizes, amounts, etc. may be presented herein in a range format. The description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as 10-20 inches should be considered to have specifically disclosed subranges such as 10-11 inches, 10-12 inches, 10-13 inches, 10-14 inches, 11-12 inches, 11-13 inches, etc.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device may be implemented in a distributed way over a network, for example as a server farm or a set of widely distributed servers, or may be implemented in a single computing device.

Although an example processing system has been described, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method, comprising:
   receiving, by a user interface, an utterance directed to querying a data query engine;
   identifying two or more previous steps of a data conversation that are indicated by the utterance, wherein the two or more previous steps were previously received by the user interface before a step having the utterance;
   determining, based on the utterance and the two or more previous steps, an effective schema targeted by the utterance, wherein the effective schema is based on (i) one or more schema objects of a plurality of schema objects stored by the data query engine and (ii) data of two or more previous result sets generated based on the two or more previous steps of the data conversation, wherein each of the previous result sets corresponds to a respective previous step of the previous steps;
   generating, based on the utterance and the effective schema, an intermediate structured query language statement that is representative of the utterance;
   generating an executable structured query language statement based on the intermediate structured query language statement, wherein the executable structured query language statement is comprised of a query language dialect of the data query engine;
   executing the executable structured query language statement for the data query engine; and
   communicating, via the user interface, a result set and metadata, wherein the result set and the metadata correspond to the execution of the executable structured query language statement.

2. The method of claim 1, wherein the user interface is configured to display a view of the step and the two or more previous steps of the data conversation.

3. The method of claim 1, wherein the user interface is configured to display a schema view of the data query engine indicative of at least some of the plurality of schema objects stored by the data query engine.

4. The method of claim 1, wherein the intermediate structured query language statement: (i) indicates an intent of the utterance; (ii) indicates a functionality of the executable structured query language statement; and (iii) is generated from a set of intermediate SQL keywords, metadata of the effective schema, and zero or more utterance tokens.

5. The method of claim 4, further comprising:
   creating the set of intermediate SQL keywords based on standard SQL keywords that include one or more user intent keywords that may manipulate or relate the two or more previous steps of the data conversation.

6. The method of claim 1, further comprising:
   extracting one or more calculations and one or more metric names indicated by the utterance; and
   encoding the one or more calculations and the one or more metric names in the effective schema.

7. The method of claim 1, further comprising:
   identifying and encoding the two or more previous result sets in the effective schema indicated by the utterance.

8. The method of claim 1, wherein generating the executable structured query language statement further comprises:
   generating the executable structured query language statement based on the intermediate structured query language statement and two or more previous executable structured query language statements corresponding to the two or more previous steps of the data conversation.

9. The method of claim 1, further comprising:
   converting the utterance directly to the executable structured query language statement based on one or more user intent keywords included in the utterance.

10. The method of claim 1, further comprising:
    causing communication of, via the user interface, an indication of one or more of: the executable structured query language statement, a confidence level of a translation of the utterance to the executable structured query language statement, and the result set.

11. The method of claim 1, further comprising:
    communicating, from the user interface accessed by a first computing device to a second user interface accessed by a second computing device, views of one or more data conversations comprising the data conversation.

12. The method of claim 1, wherein the user interface is configured to (i) receive a save input configured to store one or more data conversations comprising the data conversation, (ii) receive a replay input configured to replay the one or more data conversations, and (iii) display the result set and the metadata, and wherein the user interface comprises one or more of: graphing options for the result set, data filters for the result set, table sorting for the result set, a naming and annotation capability for the step and the previous steps of the data conversation, and a deletion capability for the step and the previous steps of the data conversation.

* * * * *